Aug. 18, 1925.

W. C. RASTETTER

BALL BAT

Filed May 7, 1923

1,549,803

INVENTOR
William C. Rastetter
BY
H. G. Burns ATTORNEY

Patented Aug. 18, 1925.

1,549,803

UNITED STATES PATENT OFFICE.

WILLIAM C. RASTETTER, OF FORT WAYNE, INDIANA.

BALL BAT.

Application filed May 7, 1923. Serial No. 637,040.

*To all whom it may concern:*

Be it known that I, WILLIAM C. RASTETTER, a citizen of the United States of America, and resident of Fort Wayne, in the county of Allen and State of Indiana, have invented certain new and useful Improvements in Ball Bats, of which the following is a specification.

This invention relates to improvements in ball bats and the object thereof is the construction of a wooden ball bat in such manner that the grain of the wood, especially that portion forming the outer thickness of the bat will extend continuously unbroken from one extreme end of the bat to the other, and thus improve both its appearance and durability.

This object is accomplished by the construction illustrated in the accompanying drawings, in which:—

The characters appearing in the description refer to parts shown in the drawings and designated thereon by corresponding characters.

Figure 1:
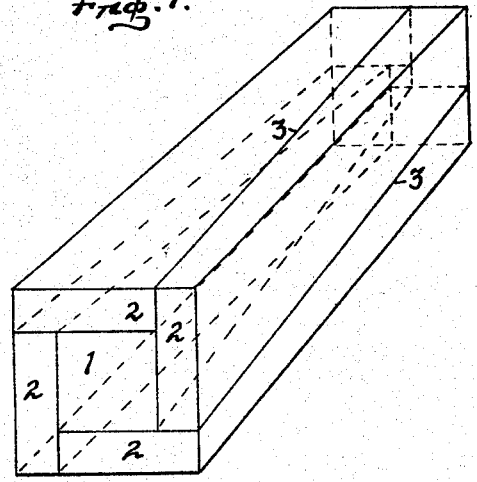
Fig. 1 is a perspective view of a composite wooden stock of which a ball bat embodying the invention is made.
Figure 2:
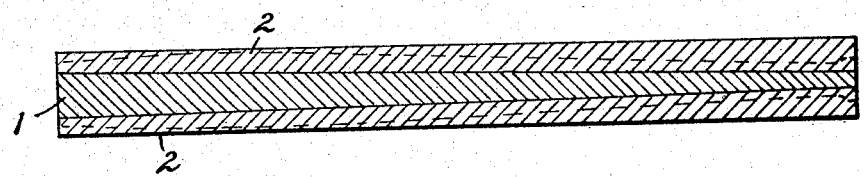
Fig. 2 is a longitudinal section of the stock with a ball bat included in dotted outlines.
Figure 3:
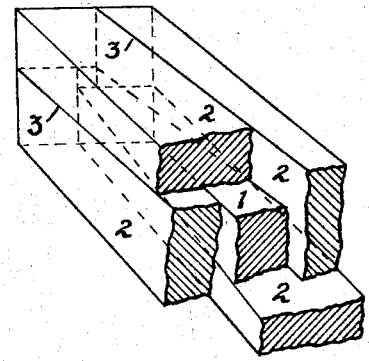
Fig. 3 is a fragmentary perspective view of the composite stock.

The invention is made by initially preparing a composite wooden stock having a longitudinal tapering core 1 enclosed by a series of exterior members 2, the ends of the core being exposed.

The core is square in cross-section and tapers gradually from one end to the other and is preferably composed of heavy, hard wood, such, for example, as hickory.

The exterior members 2 may be made of the same material or, of a different wood as desired. For example: The members 2 may be composed of a tough wood having a firm texture and which is lighter in weight than the core, such as sycamore.

In preparing the core and the exterior members for assemblage, it is the intention that the grain of the wood in the core will extend in line with its longitudinal axis, and that the grain of each exterior member 2 will run parallel with that side of the core adjacent thereto, and also parallel with the contacting plane 3 of the adjacent member that overlaps it along one of its edges. Thus, when the members are glued together upon the core, the grain of the members will lie in longitudinal parallelism at their respective joints with each other, and with the corresponding sides of the core.

The stock is then placed into a lathe and therein turned upon the axis of the core and shaped into the desired form of a ball bat in the usual manner. By construction a bat as herein set forth the outer thickness thereof formed by the exterior members presents a surface singularly free from the usual appearances of "run-out" grain, and is of superior strength as compared with bats formed in the ordinary manner, especially those made of composite stocks.

What I claim is:—

A wooden ball bat made of a composite body having a central core consisting of a single solid piece square in cross section and tapering lengthwise, and a group of external members surrounding the core, each member having a glued connection in one plane with the core and one of the adjacent members and in another plane with the other member adjacent thereto.

In testimony whereof I affix my signature in presence of two witnesses.

WILLIAM C. RASTETTER.

Witnesses:
 MATILDA METTLER,
 LUCY E. JONES.